United States Patent [19]
Saito et al.

[11] Patent Number: 5,825,097
[45] Date of Patent: Oct. 20, 1998

[54] APPARATUS FOR DRIVING ELECTRICAL LOADS PROVIDED AT A CAR

[75] Inventors: Hiroyuki Saito; Mitsuru Koni, both of Hitachinaka, Japan

[73] Assignees: Hitachi Ltd.; Hitachi Car Engineering Co., Ltd., both of Japan

[21] Appl. No.: 954,893

[22] Filed: Oct. 21, 1997

Related U.S. Application Data

[63] Continuation of Ser. No. 698,107, Aug. 15, 1996, Pat. No. 5,710,465.

[30] Foreign Application Priority Data

Aug. 31, 1995 [JP] Japan ................................ 7-223736

[51] Int. Cl.$^6$ ............................................. B60L 1/00
[52] U.S. Cl. .............................. 307/10.1; 307/32; 701/36
[58] Field of Search .................... 307/9.1, 10.1, 307/31–35; 701/29, 36, 49; 370/908, 489

[56] References Cited

U.S. PATENT DOCUMENTS

| | | | |
|---|---|---|---|
| 4,499,385 | 2/1985 | Slavik | 307/10.1 |
| 5,412,255 | 5/1995 | Wallrafen | 307/9.1 |
| 5,448,492 | 9/1995 | Kolomyski et al. | 307/31 |
| 5,488,283 | 1/1996 | Dougherty et al. | 307/10.7 |
| 5,515,937 | 5/1996 | Adler et al. | 180/65.2 |

FOREIGN PATENT DOCUMENTS 5-77680  3/1993  Japan .

*Primary Examiner*—Richard T. Elms
*Attorney, Agent, or Firm*—Evenson, McKeown, Edwards & Lenahan, P.L.L.C.

[57] ABSTRACT

An apparatus for driving electrical loads of a vehicle comprising load switches. Each of the load switches directs a start or a stop of each of the electrical loads. A memory stores a power feeding increase rate for a corresponding one of the electrical loads at a state transition of each of the load switches from an OFF to an ON state. A pair of transistors feeds power to the corresponding one of the electrical loads from a battery on receiving a load driving signal. A central process unit sends the load driving signal to the pair of transistors so that power is fed to the corresponding one of the electrical loads with a power feeding increase rate at the state transition of one of the load switch from an OFF state to an ON state. Thus, because the power fed to the electrical load gradually increases upon starting of the electrical load, AC power does not rapidly increase the power generation, and this prevents engine speed from rapidly increasing.

1 Claim, 9 Drawing Sheets

| NAME OF LOAD | FLG | KR | KF | Dmin | CUTTING OF CURRENT TO LOAD |
|---|---|---|---|---|---|
| HEAD LIGHT | NM, ID, AC, ST | +20% | −10% | 5% | − |
| | CK | − | − | − | NO |
| REAR DEFOGGER | NM, ID | +5% | −5% | 0 | − |
| | AC, ST | +10% | −20% | | − |
| | CK | − | − | − | YES |
| ⋮ | ⋮ | ⋮ | ⋮ | ⋮ | ⋮ |

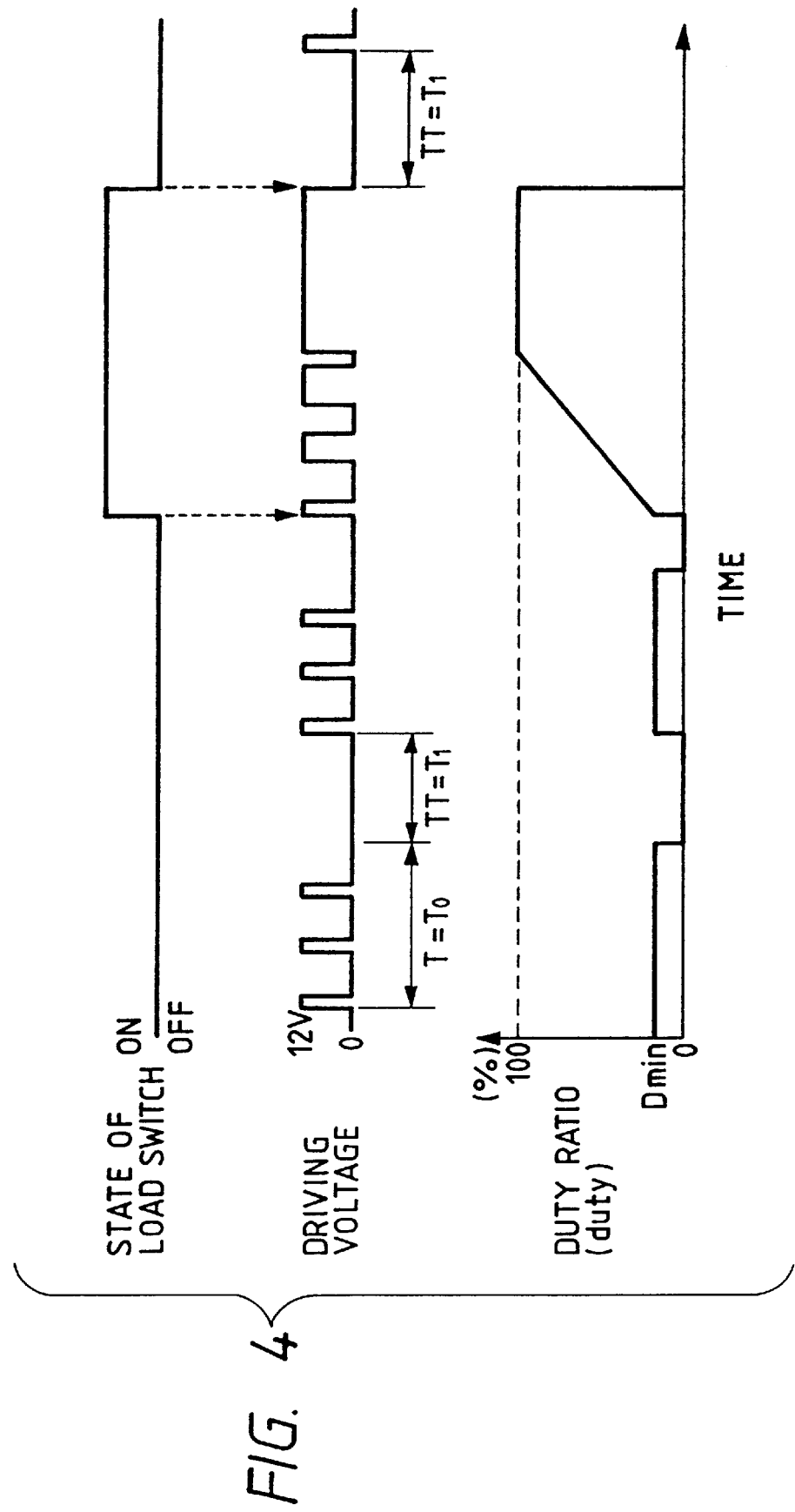

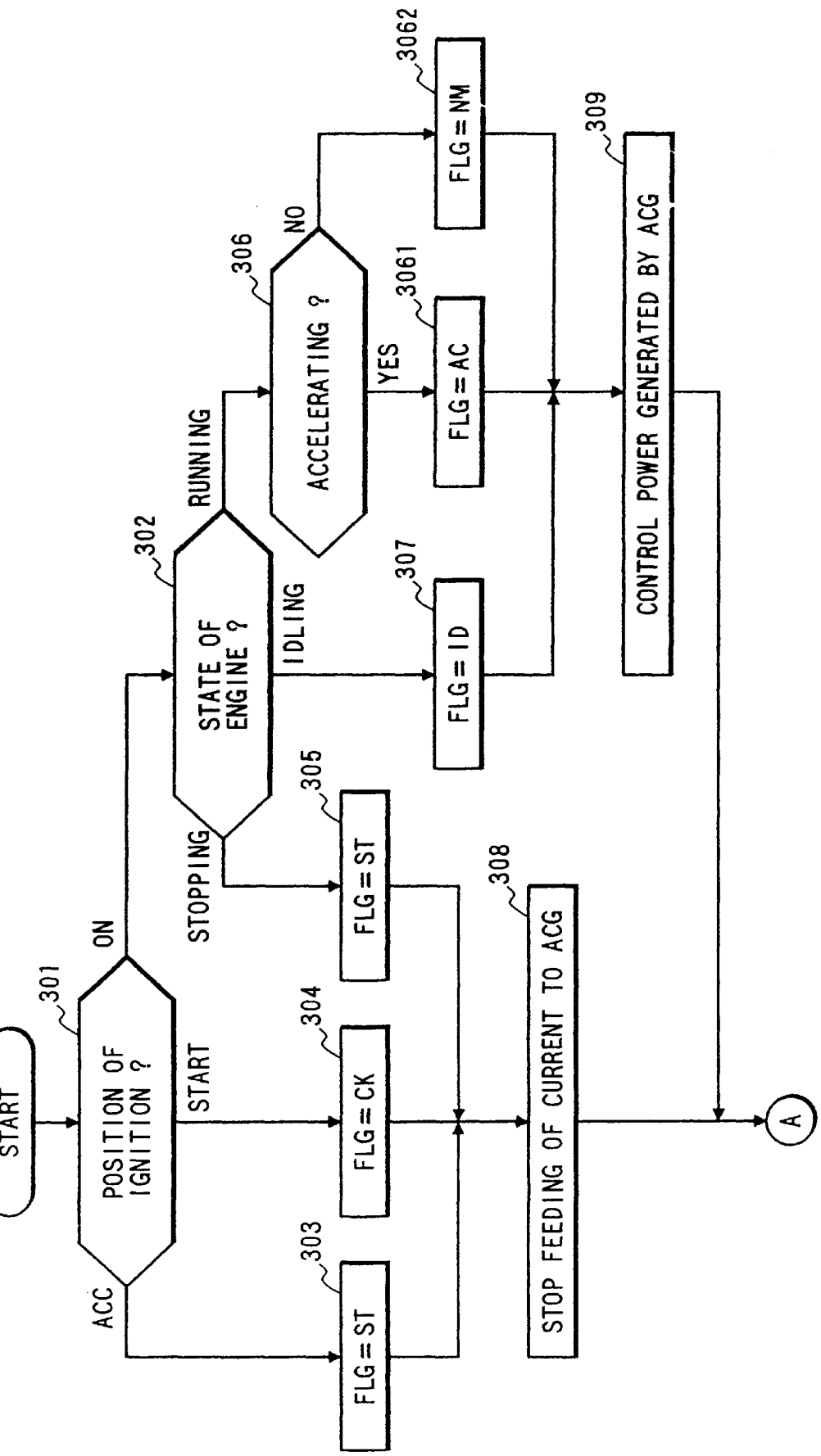

APPARATUS FOR DRIVING ELECTRICAL LOADS PROVIDED AT A CAR

This is a continuation of application Ser. No. 08/698,107, filed Aug. 15, 1996, now U.S. Pat. No. 5,710,465.

BACKGROUND AND SUMMARY OF THE INVENTION

The present invention relates to an apparatus for driving a plurality of electrical loads of a vehicle by feeding electricity to the loads from a single power source.

An apparatus for driving electrical loads of a car, for example, is disclosed in JP-A-77680/1993.

The disclosed apparatus estimates a permissible supply power of a battery and a total consumption power of electrical loads, and regulates the power fed to loads of a lower functional priority, such as a rear defogger, a sheet heater, and so forth.

Even if the above-mentioned apparatus is used, a large current, referred to as a rush current, is needed on starting an electrical load. Therefore, nevertheless the fed power for loads of a lower functional priority is stopped, engine speed decreases in response to the generator's increasing its generated power output, and the load on the engine rapidly increases, on starting of the electrical loads. That is, the existing apparatus causes the engine speed to rapidly change when the electrical loads are started.

The present invention has been achieved in consideration of the above-described problem, and is aimed at providing an apparatus for driving electrical loads of a car, in which the engine speed does not rapidly change, even if operational states of an electrical load change.

To attain the above-mentioned objective, the present invention provides an apparatus for driving electrical loads of a car, comprising:

a plurality of direction devices comprising load switches, each of the direction devices being provided at one of a plurality of electrical loads arranged at the car, for directing an ON/OFF state of the one of the plurality of electrical loads;

storage apparatus or a memory for storing an increase rate per unit time of power feeding (hereafter referred to a power feeding increase rate) preset for each of the plurality of electrical loads when a corresponding one of the direction devices indicates a state transition from an OFF state to an ON state;

a plurality of drive devices comprising an output front stage transistor and an output driving stage transistor, each of the drive devices being provided at each of the plurality of electrical loads, for feeding power to the one of the plurality of electrical loads and for changing the amount of a power fed to the one from a power source; and control apparatus comprising a CPU for checking an operational state of each of the plurality of electrical loads, and, if the control apparatus has judged that at least one of the direction devices has indicated the state transition, sending such a control signal to a corresponding one of the drive devices that power is fed to a corresponding one of the electrical loads from the power source, with a power feeding increase rate preset and stored in the storage apparatus, corresponding to the electrical load.

In the above-mentioned apparatus for driving the electrical loads, further, the storage apparatus stores a minimum ratio of power feeding (hereafter referred to a minimum power feeding ration) preset for each of the plurality of the electrical loads, which is kept even at a OFF state of a corresponding one of the direction devices, and the control apparatus sends such a control signal to a corresponding one of the drive devices that power is fed to a corresponding one of the electrical loads from the power source, which is at a stopping state, with a minimum power feeding ratio preset and stored in the storage apparatus, corresponding to the electrical load at the stopping state.

In the above-mentioned apparatus for driving the electrical load, further, an engine state detector comprising a key switch, an accelerator opening sensor and an engine revolution speed sensor for detecting an operational state of an engine of the car is included. The storage apparatus stores a power feeding increase rate preset for each of the plurality of electrical loads, according to each of the predetermined operational states of the engine, and the control apparatus or CPU checks a switching state of each of the plurality of direction devices. If the control apparatus judges that at least one of the direction devices has indicated the state transition, it sends such a control signal to a corresponding one of the drive devices that power is fed to a corresponding one of the electrical loads from the power source, with a power feeding increase rate preset and stored in the memory, corresponding to the electrical load and according to an operational state of the engine detected by the engine state detector.

In the above-mentioned apparatus for driving the electrical loads, the engine state detector includes an engine starting state detector for detecting whether the engine is at a starting state, the storage apparatus stores data indicating whether power is to be fed to each of the plurality of electrical loads, depending on functional importance of a corresponding one of the electrical loads, when a corresponding one of the direction devices directs driving of the corresponding one of the electrical loads at the starting state of the engine, and the control apparatus determines whether power is to fed to one of the plurality of electrical loads, of which driving is directed by one of the direction devices, and sends such a control signal to a corresponding one of the drive devices that power feeding to the corresponding one of the electrical loads is stopped if the control apparatus determines it is not necessary to feed power to the electrical load. Power feeding to the corresponding one of the electrical loads is continued if the control apparatus determines it is necessary to feed power to the electrical load, by referring to the data stored in the memory.

In the above-mentioned apparatus for driving the electrical loads, further, the engine state detector includes an accelerator operating amount detector for detecting an operation amount of an accelerator pedal operated by an operator, the storage apparatus stores a decrease rate per unit time of power feeding (hereafter referred to a power feeding decrease rate) preset for each of the plurality of electrical loads if an acceleration required by an operator exceeds the predetermined value, and the control apparatus estimates the acceleration required by an operator based on the operation amount of the accelerator pedal detected by the accelerator operating amount detector, and sends such a control signal to a corresponding one of the drive devices that power is fed to one of the plurality of electrical loads, of which driving is directed by one of the direction devices, with a power feeding decrease rate preset and stored in the storage apparatus, corresponding to the electrical load.

In the above-mentioned apparatus for driving the electrical loads, a fuel amount detector is provided for detecting a residual fuel amount left in a fuel tank of the car, the storage apparatus stores a decrease rate per unit time of power feeding (hereafter referred to a power feeding decrease rate) preset for each of the plurality of electrical loads, the power feeding decrease rate for each of the plurality of electrical loads being used when the residual fuel amount is less than the predetermined value, and the control apparatus sends such a control signal to a corresponding one of the drive devices that power is fed to one of the plurality of electrical loads, of which driving is directed by one of the direction devices, with a power feeding decrease rate preset and stored in the memory, corresponding to the electrical load, if the residual fuel amount detected by the fuel amount detector is less than the predetermined value.

As mentioned above, if at least one of the direction devices indicates the state transition from a stopping state to an operation state, the control apparatus sends such a control signal to a corresponding one of the drive devices that power is fed to a corresponding one of the electrical loads with a power feeding increasing rate preset and stored in the memory, corresponding to the electrical load. Thus, power is fed to the electrical load with the preset power feeding increase rate from the power source. That is, when starting of an electrical load is directed by one of the direction devices manipulated by an operator, power feeding to the electrical load starts and the ratio of the power feeding gradually increases. Therefore, at the stating state of an electrical load, because it hardly happens that the generator rapidly increases the generated power, and puts a rapid load on the engine, the engine speed can be kept stable.

BRIEF DESCRIPTION OF THE DRAWINGS

FIG. 4 is a composite of three graphs showing changes of a load driving voltage and a duty ratio for a corresponding electrical load in accordance with changes of a directing state of a load switch, in the embodiment.

FIG. 6 is a part No. 1 of a flow chart showing operations of the control unit of the embodiment.

DETAILED DESCRIPTION OF THE EMBODIMENTS

Figure 1:
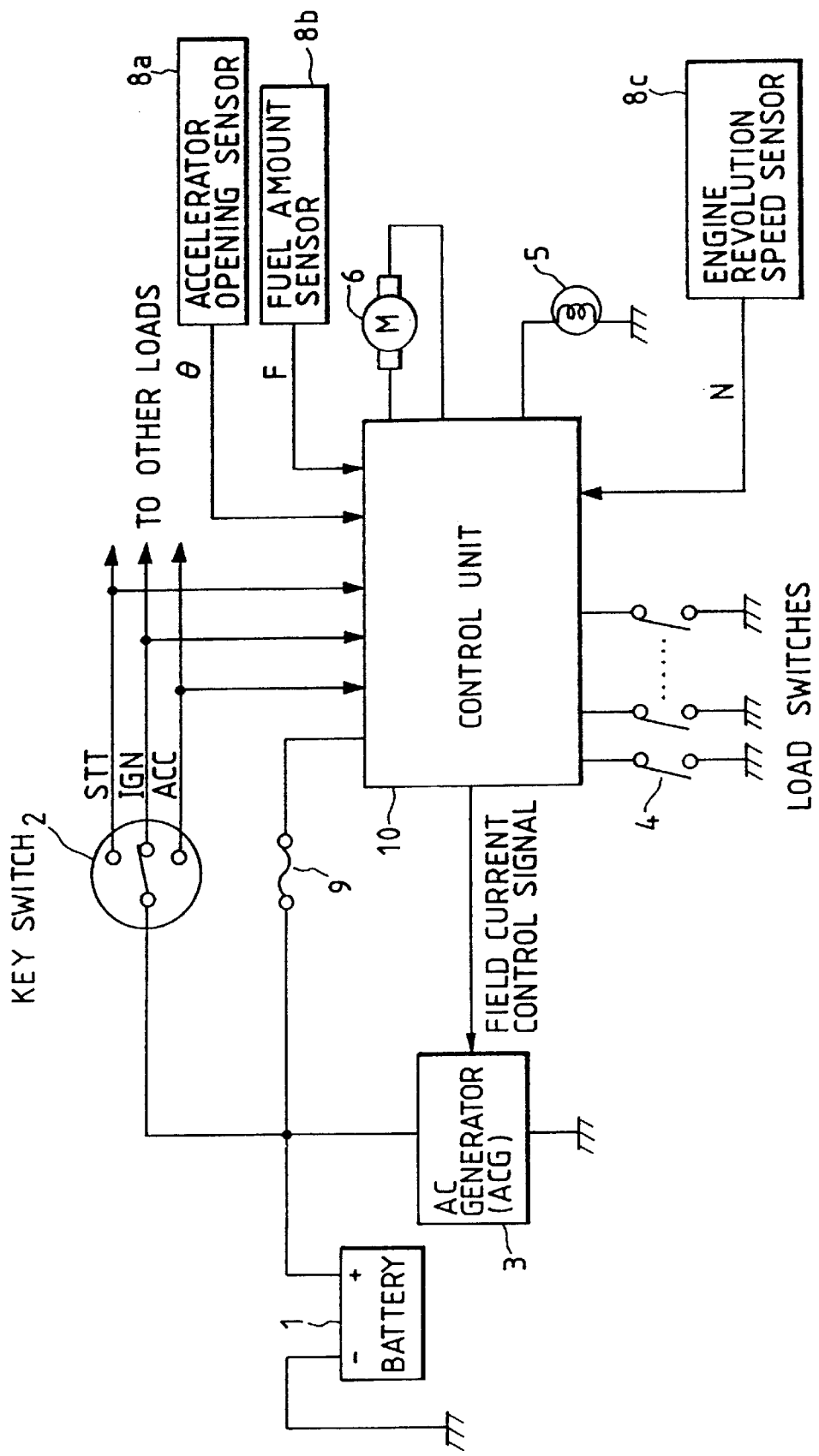
FIG. 1 is a block diagram of an apparatus for driving electrical loads of an embodiment in the present invention.

Hereinafter, an apparatus for driving electrical loads in a vehicle, of the present invention, will be explained in detail by referring to the drawings.

As shown in FIG. 1, the apparatus for driving electrical loads provided in a car is composed of a battery 1, a key switch 2 for starting an engine, an AC generator 3 rotated or powered by the engine, electrical loads such as lamps 5, motors 6 and so forth, load switches 4 for directing start/stop of the electrical loads 5, 6, etc., an accelerator opening sensor 8a for detecting an operation amount of an accelerator pedal, a fuel amount sensor 8b for detecting a residual fuel amount left in a fuel tank of the car, an engine revolution speed sensor 8c for detecting the number of engine revolutions, and a control unit 10 for controlling power fed to each of the electrical loads 5, 6, etc. from a power source.

The power is fed to the control unit 10 via a fuse 9 from a positive electrode of the battery 1. To the control unit 10, each of states of the key switch 2 (ACC: operation of accessories, IGN: operation of ignition and STT: operation of a starter) is input to determine an operational state of the engine. The control unit 10 also takes in signals from the fuel amount sensor 8b and the engine revolution speed sensor 8c. Further, the control unit 10 monitors a ON/OFF state of the load switches 4, and controls the electrical loads 5, 6, etc. and the AC generator 3, in accordance with procedures prepared in advance, according to outputs from the key switch 2 and the sensors 8a, 8b and 8c.

Figure 2:
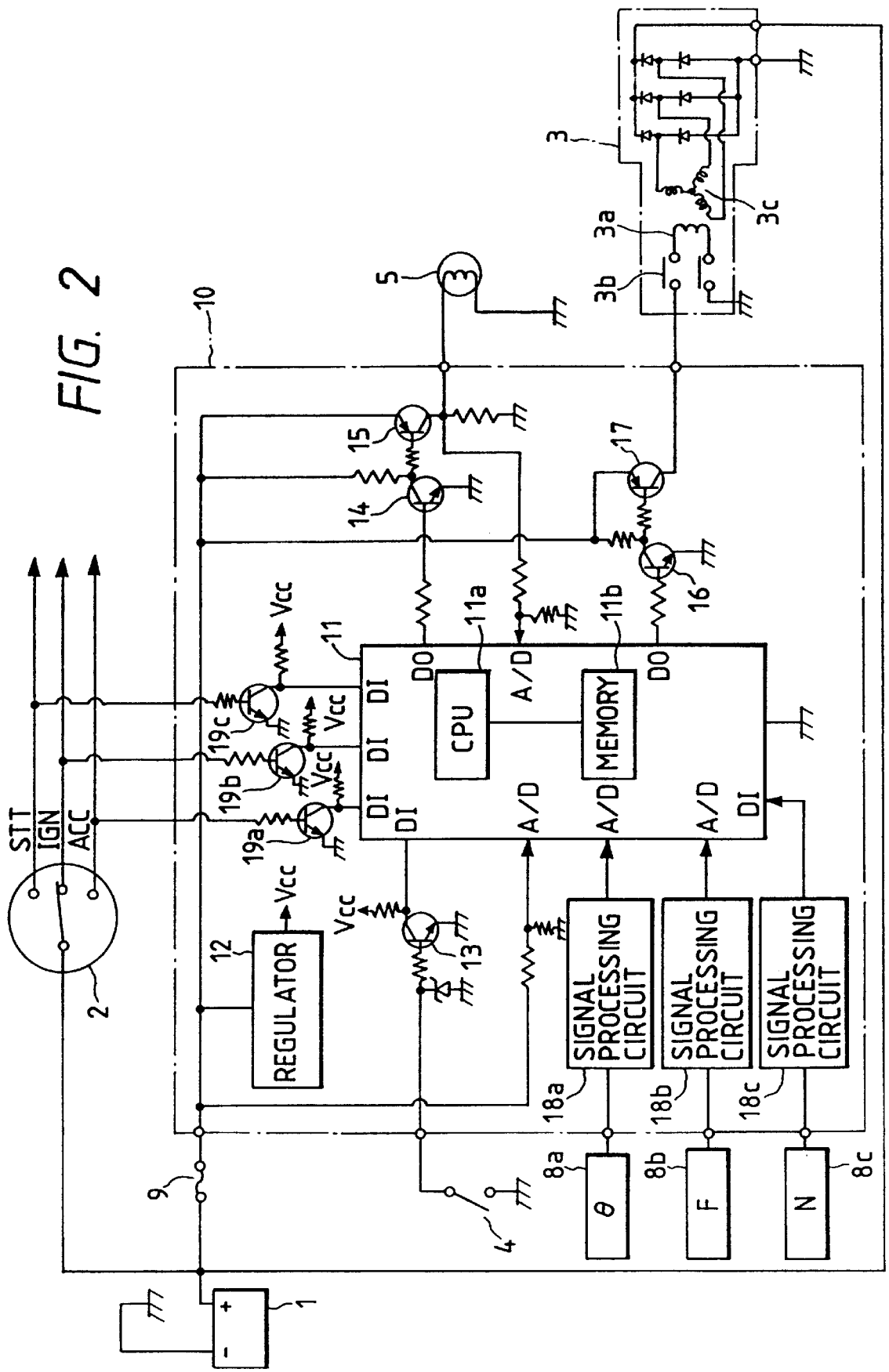
FIG. 2 is a block diagram showing a circuit of a control unit of the embodiment.

As shown in FIG. 2, the control unit 10 is composed of a microcomputer 11 for controlling the electrical loads and other electrical equipment, a regulator 12 for keeping the voltage of the battery 1 at a target constant value (5 V), an input stage transistor 19a for inputting a ON signal of the ACC to the microcomputer 11 when the key switch is turned to a position of the accessories (ACC), an input stage transistor 19b for inputting a ON signal of the IGN to the microcomputer 11 when the key switch is turned to a position of the ignition (IGN), an input stage transistor 19c for inputting a ON signal of the STT to the microcomputer 11 when the key switch is turned to a position of the starter (STT), and input stage transistors 13, one of the transistors 13 for inputting a ON signal of the one of the load switches 4 to the microcomputer 11 when one of the load switches 4 is turned on. Further, the control unit 10 is composed of an output driving stage transistor 15 for driving the electrical load 5 by feeding power to the load 5 from the battery 1, an output front stage transistor 14 for driving the output driving transistor 15 in accordance with a drive signal from the microcomputer 11, an output driving stage transistor 17 for feeding power to a field coil 3a of the AC generator 3 from the battery 1, an output front stage transistor 16 for driving the output driving transistor 17 in accordance with a drive signal from the microcomputer 11, and signal processing circuits 18a, 18b and 18c for converting signal levels of outputs from the sensors 8a, 8b and 8c to the levels at which the microcomputer 11 can process the signals. The microcomputer 11 is composed of a memory 11b storing various kinds of data and programs for realizing flow charts shown in FIGS. 6–9 by using a table containing control parameters shown in FIG. 3, and a CPU 11a for executing calculations instructed by the programs stored in the memory 11b. Further, the AC generator 3 is composed of a stator coil 3c of a stator, the field coil 3a of a part of a rotor, and a brush 3b for feeding power to the rotating field coil 3a from the battery 1. In the AC generator 3, when the current flows in the field coil 3a of the rotor rotated by the engine, the field coil 3a is excited, and the current flows in the stator coil 3c, that is, the AC current is generated. Meanwhile, although only one load switch and one electrical load are indicated in FIG. 2 to simplify the figure, there are actually a plurality of load switches and electrical loads as shown in FIG. 1.

The voltage of the battery 1 is decreased to the optimal voltage (5 V) for the control microcomputer 11 by the regulator 12, and fed to the microcomputer 11. The input stage transistor 13 is turned on/off in accordance with an on/off state of the load switch 4, and converts the level of the state signal of the load switch 4 so that the microcomputer 12 can takes in the state signal of the load switch 4. The output front stage transistor 14 is used to drive the output drive stage transistor 15, corresponding to a drive signal output from the microcomputer 11 via a digital signal output port DO. The output drive stage transistor 15 is turned on/off in accordance with an on/off state of the output front stage transistor 14, and drives the electrical load 5 by feeding power to the electrical load 5 from the battery 1. For controlling of the electrical load 5, the PWM (Pulse Width Modulation) method is applied. A terminal voltage of the electrical load 5 is fed back to the microcomputer 11 via an A/D converting input port. The microcomputer 11 has a function of regulating the power generated by the AC generator 3 based on a difference between the standard voltage of the battery and the battery voltage level-converted by a resistive divider which is converted to a digital signal by an A/D port. The power generated by the AC generator 3 is controlled by adjusting the current flowing in the field coil 3a of the AC generator 3 with the output drive stage transistor 17 derived by a field current control signal output from the microcomputer 11 via a digital signal output port DO. The levels of outputs from the sensors 8a and 8b are converted to levels adequate to processing of the microcomputer 11 by the signal processing circuits 18a and 18b, and the processed outputs are taken into A/D converting ports of the microcomputer 11. By the signal processing circuit 18c, waveform shaping of the output from the engine revolution speed sensor 18c is carried out and the level of the output is converted to a level adequate to processing of the microcomputer 11. The processed output is input to a digital signal input port DI. These sensor signals can be taken in by using a transmitting port if the signals are processed as mentioned above, by using a separate signal processing circuit.

Meanwhile, the above-mentioned PWM control method is explained as follows, by referring to FIG. 4.

In the embodiment, the output drive stage transistor 15 controls the duty ratio of the current flowing in the electrical load by repeating on/off operations so as to flow intermittent current in the electrical load and to adjust the on-state time ratio of the output drive stage transistor 15. The above-mentioned duty ratio means a ratio of the total current feeding time to the predetermined control period, that is, the time of feeding current per unit time (a current feeding ratio), or the time of feeding power per unit time (a power feeding ratio).

In the embodiment, if the load switch 4 is turned on, the on-state time width of the output drive transistor 15 gradually increases, that is, the duty ratio of the current flowing in the electrical load gradually increases. A change rate of a duty ratio, namely, a change rate of a power feeding amount, for each of the electrical loads, which is shown as KR or KF in FIG. 3 (means of the symbols will be explained later) is stored in the memory 11b of the microcomputer 11. The change rate K of a duty ratio is a change amount of a duty ratio per unit time, equal to the gradient K of a curve showing changes of a duty ratio expressed in the coordinates of the abscissa of time and the ordinate of duty ratio, shown in FIG. 5.

Further, in the embodiment, even during the OFF state of the load switch 4, the intermittent current is flowed in the electrical load 5 by intermittently driving the output drive stage transistor 15. The microcomputer 11 controls feeding of the intermittent current during a period T0 (the intermittent current feeding period) managed by using a timer T, and stopping the intermittent current during a period T1 managed by using a timer TT. During the OFF state of the load switch 4, the duty ratio of the current flowing in the electrical load 5 is the minimum duty ratio, and a value of the minimum duty ratio for each of the electrical loads is stored in the memory 11b of the microcomputer 11, expressed as Dmin in FIG. 3.

The CPU 11a of the microcomputer 11 executes various kinds of control process in accordance with procedures shown by flow charts in FIGS. 6–9, described in programs stored in the memory 11b. The flow charts show the procedures for one of the electrical loads, representatively, and a series of the procedures are carried out with the predetermined period, for example, of 1 ms.

At step 301 of the flow chart in FIG. 6, a position of the key switch 2 is checked. When the position of the key switch 2 is a position of accessories or engine stopping (a position other than ignition or starter operating), the process goes to step 303, and "ST (stopping)" is set to a key position flag FLG. When the position of the key switch 2 is a position of starter operating (cranking), the process goes to step 304, and "CR (cranking)" is set to the key position flag FLG. When the position of the key switch 2 is a position of ignition (ON), the process goes to step 302. At the step 302, an operational state of the engine is judged based on the output from the engine revolution speed sensor 8c, and the process goes to step 305 and "ST (stopping)" is set to the key position flag FLG if the engine is stopping. On the other hand, if the detected engine revolution speed is less than the predetermined speed, and it is determined that the engine is at an idling state, the process goes to step 307, and "ID (idling)" is set to the key position flag FLG. If the detected engine revolution speed is equal to or more than the predetermined speed, the process goes to step 306. At the step 306, it is judged whether the acceleration required by an operator is equal to or more than the predetermined speed, by estimating whether the operation amount change of the accelerator conducted by the operator is equal to or more than the predetermined value (for example, 50 deg/sec), based on the output from the accelerator opening sensor 8a. If the acceleration required by an operator is equal to or more than the predetermined speed, "AC (acceleration)" is set to the key position flag FLG at step 3061, otherwise "NM (normal)" is set to the key position flag FLG at step 3062. Further, if the key position flag is ST (stopping) or CK (cranking), and it is judged that the engine is at the stopping state or the cranking state, the AC generator 3 is stopped by cutting off the field current of the AC generator 3 in order to reduce the consumption power, at step 308. On the other hand, if the key position flag is NM (normal), AC (acceleration) or ID (idling), because it is judged that the engine is rotating, the AC generator 3 is controlled so as to keep the target standard voltage by the previously-mentioned control method, at step 309.

Figure 7:
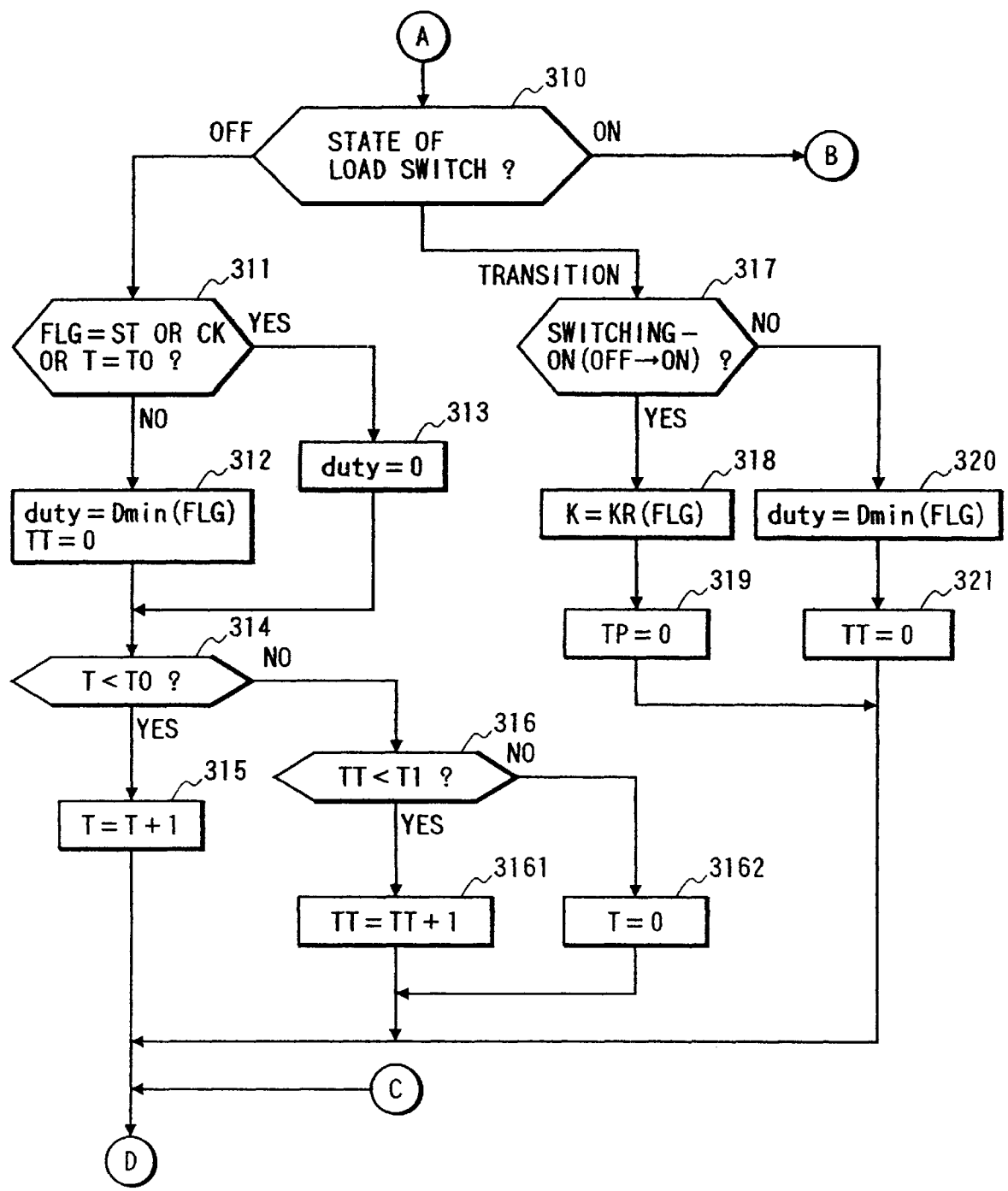
FIG. 7 is a part No. 2 of a flow chart showing operations of the control unit of the embodiment.
Figure 8:
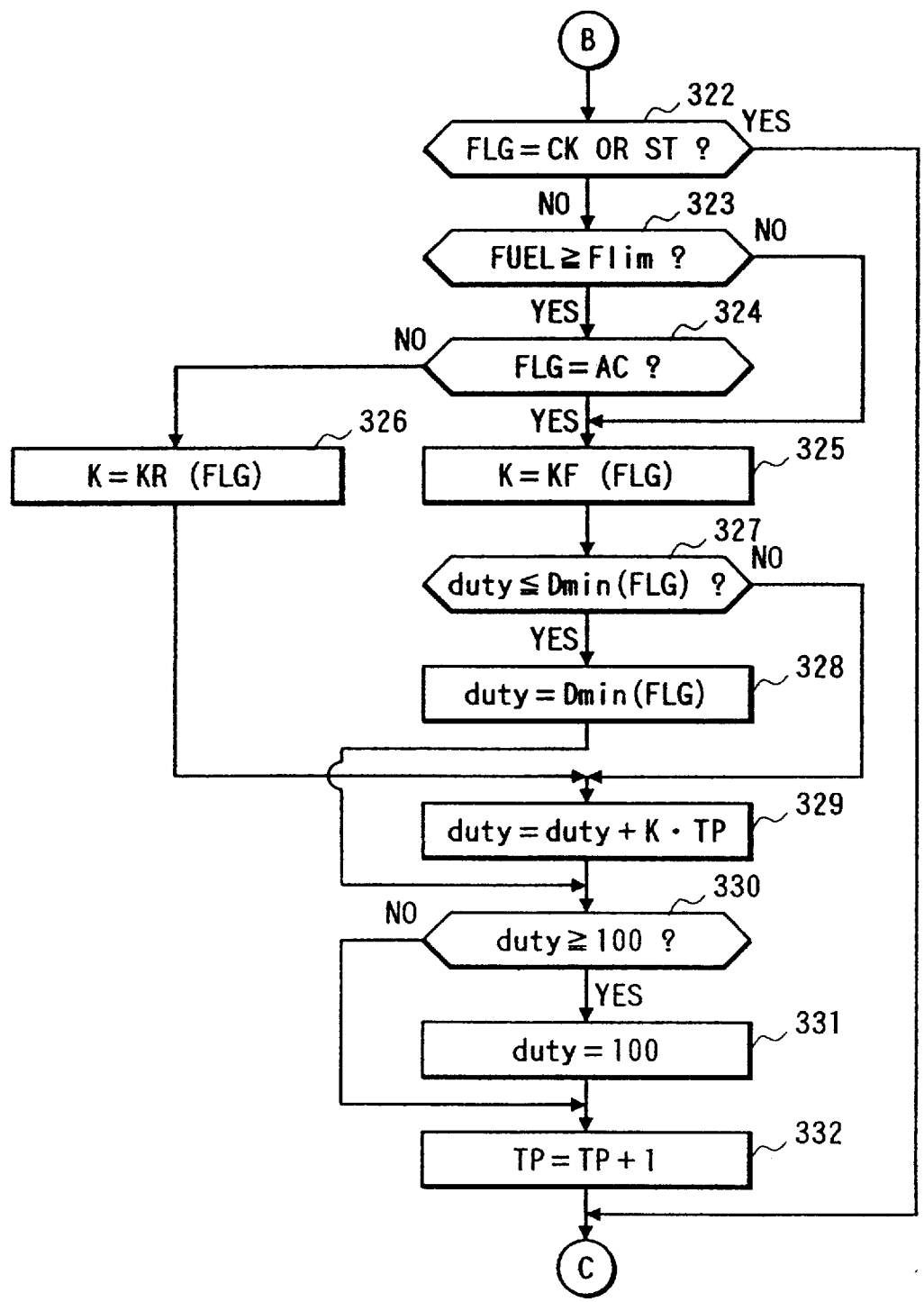
FIG. 8 is a part No. 3 of a flow chart showing operations of the control unit of the embodiment.
Figure 9:
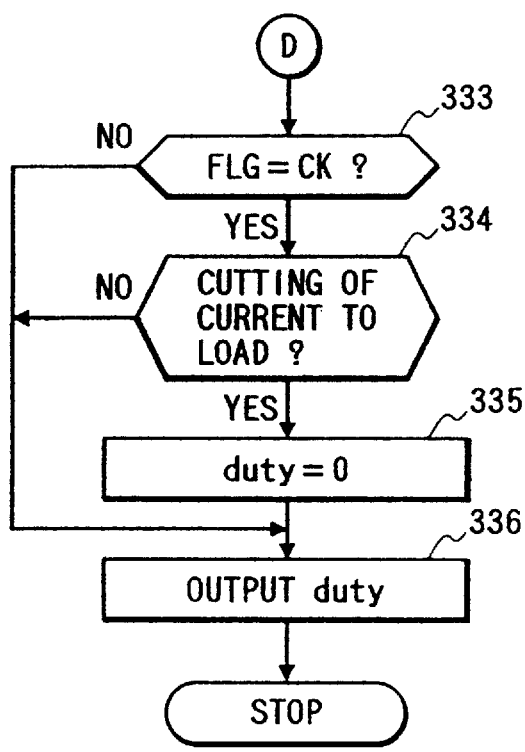
FIG. 9 is a part No. 4 of a flow chart showing operations of the control unit of the embodiment.

After the steps 308 and 309 for controlling the field current of the AC generator 3, the process goes to step 310 shown in FIG. 7. At the step 310, the state of the load switch 4 is checked. If the state of the load switch 4 is an OFF state (directing a corresponding electrical load to stop), the process goes to step 311, and if an ON state (directing a corresponding electrical load to start), the process goes to step 381 shown in FIG. 8, and if a transition state (indicating a state transition from the OFF state to the ON state), the process goes to step 317 shown in FIG. 7. The procedures following the step 310 is also executed for each of the electrical loads with a specified period.

Figures 3, 5:
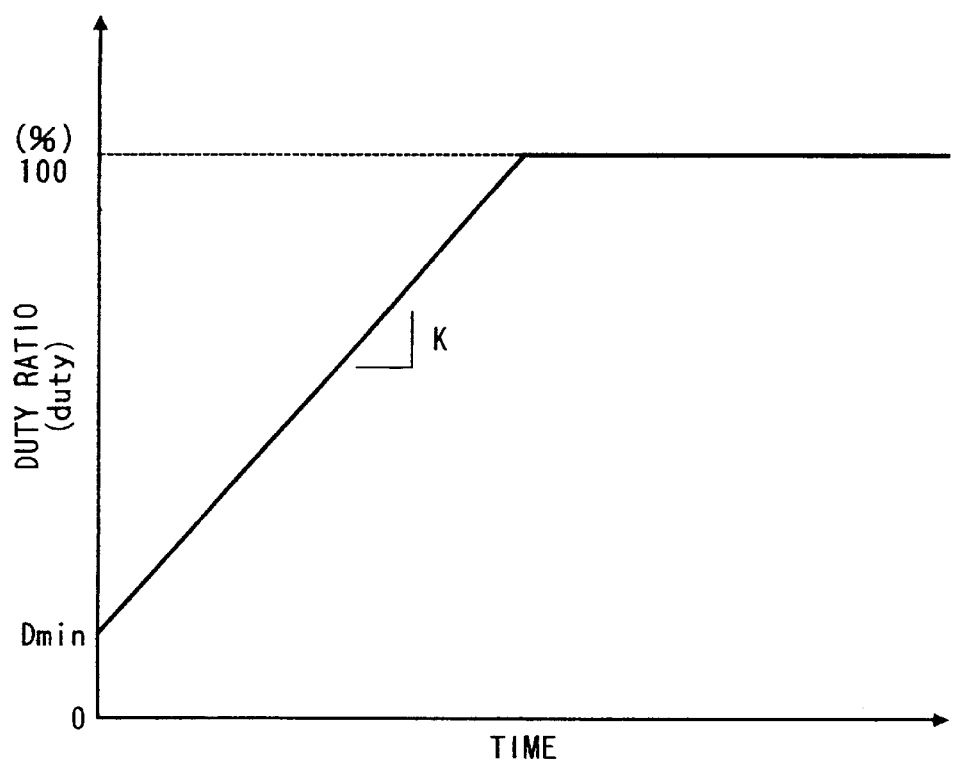
FIG. 3 is a diagram showing examples of changing rates of power feeding, KR and KF, and the minimum power feeding ratio Dmin of the embodiment.
FIG. 5 is a graph showing changes of a duty ratio during a transient state started by a state transition operation from an OFF state to an ON state of a load switch, in the embodiment.

At the step 311, it is judged whether the engine is at the stopping state or the starting state, that is, the key position flag FLG is ST (stopping) or CR (cranking), and further whether the timer T for counting the time of feeding the intermittent current to the electrical load 5, indicates the predetermined time T0. If an intelligent type semiconductor element having a current limitation function 16 is used as an element for driving an electrical load, namely, the output drive stage transistor, the current limitation function automatically operates, and starting of the electrical load 5 is somewhat delayed, because the rush current at starting of the electrical load 5 largely exceeds a limit of current flow for the semiconductor element 15. In the embodiment, in order to prevent this problem, a small current (called an idling current) is flowed in the electrical load 5 even during stop of the load 5. That is, at the step 311, if the key position flag FLG is not ST and CK, and the engine is completely rotating, and the timer T does not indicate T0, it indicates that the AC generator 3 generates the power by rotation of the engine and power supply of the car is sufficient. Therefore, the process goes to step 312, and the duty ratio of the intermittent current fed to the stopping electrical load 5 is set to the minimum duty ratio Dmin. As shown in FIG. 3, a value of Dmin is expressed as a function of the key position flag FLG, that is, the value changes depending on the key position. At the step 312, the contents of the timer TT for counting the time of feeding the intermittent current are also initialized to 0. At the step 311 also, if the key position flag FLG is ST or CK, and the engine is not completely rotating, and the timer T indicates To, it indicates that the power is not fed to the AC generator 3. Therefore, surplus power consumption is avoided by setting 0 to the duty ratio of the intermittent current in order to stop feeding of the intermittent current.

After the duty ratio of the intermittent current is set at the steps 312 and 313, the process goes to step 314. At the step 314, it is judged whether the time of feeding the intermittent current which is counted by the timer T for measuring the intermittent current feeding time, is less than the time T0, and if the feeding time is less than the time T0, the process goes to step 315, and the contents of the timer T are increased by 1. If the feeding time counted by the timer T for measuring the intermittent current feeding time, is equal to or more than the time T0, the process goes to step 316, and it is judged whether the time of stopping the intermittent current which is counted by the timer TT for measuring the intermittent current stopping time, is less than the time T1. If the stopping time is less than the time T0, the process goes to step 3161, and the contents of the timer TT are increased by 1. If the stopping time counted by the timer TT for measuring the intermittent current stopping time, is equal to or more than the time T1, because the period for stopping the intermittent current has been finished, the contents of the timer t for measuring the intermittent current feeding time are reset to 0 in order to prepare the conditions for restarting of the intermittent current feeding. After the setting of the timers T and TT at the steps 315, 3161 and 3162, the process goes to step 333.

On the other hand, if it judged that the load switch 4 has indicated the state transition, at the step 310, the process goes to step 317. At the step 317, it is judged whether the state of the load switch 4 has been switched from the ON state to the OFF state. Further, if it is judged that the state transition from the ON state to the OFF state, namely, the transition state in feeding the power, has been indicated, the process goes to step 318, and if it is judged that the state transition from the OFF state to the ON state, namely, the transition state for stopping the power, has been indicated, the process goes to step 320. At the step 318, a value of KR is set to the duty ratio increasing rate K corresponding to the electrical load 4, by looking up the control data table (FIG. 3) stored in the memory 11b, prepared for adjusting of power feeding to the electrical loads, according to the various operational conditions of the car. The value of KR is expressed as a function of the key position flag FLG, and changes depending on the key position. Further, the process goes to step 319, and a timer TP for measuring the time of a ON state of the load switch is initialized to 0. On the other hand, at step 320, after the load switch is turned off, a value of Dmin is set to the duty ratio of the intermittent current, as is the process at the step 312, so that the intermittent current immediately flows in the electrical load 5. At step 321, the timer TT for measuring the intermittent current stopping time is reset to 0 so as to prepare the conditions for restarting of the intermittent current stopping. After the setting of the timers TP and TT at the steps 319 and 321, the process goes to 333.

On the other hand, if it is judged that the load switch 4 is at the ON state, at the step 310, and the process goes to step 322, it is judged whether the engine is at the stopping or starting state, that is, the key position flag FLG is ST or CK, at the step 322, as is the process at the step 311. If the key position flag FLG is ST or CK, and it is judged that the engine is not completely rotating, the process goes to step 333, and if the key position flag FLG is not ST and CK, and it is judged that the engine is completely rotating, the process goes to step 323. At the step 323, it is checked whether the residual amount of fuel FUEL remaining in a tank of the car, detected by the fuel amount sensor 8b, is more than the predetermined amount Flim. If the residual amount of fuel FUEL is more than the predetermined amount Flim, the process goes to step 324, otherwise the process goes to step 325. At the step 324, it is further judged whether the key position flag FLG is AC, that is, the engine is at the acceleration state. If the engine is at the acceleration state, the process goes to the step 325, otherwise to step 326. At the step 325, because the electrical load 5 is operating and the residual amount of fuel is small, or the electrical load 5 is operating and the engine is at the acceleration state, power supplies to electrical loads of low functional importance are reduced in order to reduce the load of the engine. The reduction of power supplies to the electrical loads of a low importance is carried out by setting a negative value KF prepared in the control data table (FIG. 3) stored in the memory 11b, to a duty ratio changing rate for each of these electrical loads. The value of KF, as is KR mentioned above, changes depending on the key position since it is expressed as a function of the key position flag FLG, and has a negative value. At step 327, it is checked whether the innovated duty ratio of the current is less than the minimum value Dmin, and if the innovated duty ratio is less than Dmin, the process goes to step 330 after the duty ratio is reset to Dmin at step 328. On the other hand, at step 327, if it is judged that the innovated duty ratio of the current is more than the minimum value Dmin, the process goes to step 329. If the engine is not at the acceleration state at the step 324, and the process goes to step 326, a positive value KR prepared in the control data table (FIG. 3) stored in the memory 11b, is set to a duty ratio changing rate of the current fed to the electrical load, as is the process at the step 318. Meanwhile, at the step 326, the amount of remaining fuel is sufficient and the engine is not at the acceleration state. Therefore, since it is not necessary to reduce the current fed to the electrical load in order to reduce the load of the engine, the positive value KR is set to the duty ratio changing rate so as to increase a power supply to the electrical load 5. At the step 329, the present duty ratio of the current feeding is obtained by adding the product of the duty ratio changing rate K and the elapsing time TP from the turning-on of the load switch 4 to the present time, to the previous duty ratio. Further, at the step 330, it is judged whether the duty ratio obtained at the step 329 is equal to or more than 100%, and if the duty ratio is equal to or more than 100%, the duty ratio is fixed to the upper limit 100%. Then, the process goes to step 332. On the other hand, if the duty ratio is less than 100%, the process immediately goes to the step 332. At the step 332, the counts of the timer TP for measuring the time of a ON state of the load switch are increased by 1 for preparing the control of the next time step.

After the setting of the timers T, TT and TP at the steps 315, 3161, 3162 and 319, the process goes to step 333. At the step 333, it is judged whether the key position flag FLG is CK, that is, the cranking state, and if the engine is at the cranking state, the process goes to step 334, otherwise to step 336. At the step 334, it is determined whether the present electrical load is to be stopped at the cranking state, by referring to the control data table (FIG. 3) stored in the memory 11b. If the present electrical load is not to be stopped (for example, a rear defogger), the process goes to the step 336, otherwise to step 335. At the step 335, in order to stop the electrical load to be stopped at the cranking state, the duty ratio of the current fed to the electrical load is set to 0, and the process goes to the step 336. At the step 336, the control signal is sent to the output front stage transistor 14 so that the output front stage transistor 14 and the output drive transistor 15 feed the current corresponding to the duty ratio set at the steps 312, 313, 320, 328, 329 and 331, to the electrical load.

FIG. 3 shows the preset data of the power duty ratio or the power duty ratio changing rate for a pair of headlights and a rear defogger as examples of the electrical loads. As to the head light, if the engine operational state flag FLG is other than CK, namely, the cranking state, values of KF, KR and Dmin are preset independently of the contents of FLG. Because the value of Dmin is set to 5%, the current is always intermittently fed to the pair of head lights even if the load switch of the pair of head lights is at the OFF state. Therefore, when the load switch of the pair of head lights is turned on, the pair of head lights immediately start lighting. Furthermore, feeding of the current to the pair of head lights is not cut even if FLG is CK, namely, the cranking state. As to the rear defogger, the different values of KR and KR are prepared depending on the states of FLG indicating ID (idling) and NM (normal operation), or the states of FLG indicating ST (stopping) and AC (acceleration), respectively. Further, the minimum duty ratio Dmin is set to the duty ratio for the rear defogger because it is not required that the rear defogger immediately start up when the load switch of the rear defogger is turned on. Feeding of the current to the rear defogger is cut if FLG is CK, namely, the cranking state, unlike the pair of head lights. The control data table shown in FIG. 3 is stored in the memory 11b of the microcomputer 11, and the microcomputer 11 determines the power duty ratio or the power duty ratio changing rate for each of the electrical loads, by looking up the control data table stored in the memory 11b.

In the illustrated embodiment, at the state transition from the OFF state to the ON state of the load switch, namely, the power feeding start period, the duty ratio increasing rate KR is set at the step 318, and the amount of the power feeding to the electrical load gradually increases at a constant rate as shown by the lowest graph in FIG. 4, and in FIG. 5. Therefore, it does not occur that the power generated by the AC generator 3 rapidly increases. That is, it does not happen that the engine speed rapidly goes down, due to the rapid increase of the engine load at the power feeding start period. Furthermore, in the illustrated embodiment, even at the state other than the power feeding start period, if the load switch 4 is at the ON state, and the engine ordinarily rotates, and sufficient fuel is left, and the engine is not accelerated, that is, it is sufficiently possible that the engine load is increased, the duty ratio increasing rate KR is applied to the duty ratio of the electrical load at the step 326.

Further, in the embodiment, when it is not preferable to increase the engine load, for example, at the state of little residual fuel or engine acceleration, the duty ratio decreasing rate KF is applied to the duty ratio of the electrical load at the step 525. Thus, feeding of the current to the electrical load gradually decreases at a constant rate, which reduces the engine load due to the power generation of the AC generator 3.

As mentioned above, in the embodiment, because the power feeding duty ratio or the power feeding duty ratio changing rate for each of the electrical loads is changed corresponding to the state of the load switch 4 or the operational state of the engine, even if the power is fed to the electrical loads, the engine speed can be kept stable, which improves operational performance of the car.

Further, in the embodiment, at starting operations of the engine (the cranking state), the power is not fed to the rear defogger of low functional importance fora definite time, even though the load switch for the rear defogger is turned on. Therefore, a sufficient power is secured at starting operations of the engine, and the engine can be easily and smoothly started.

Although the duty ratio changing rate is set to a constant value and the duty ratio linearly changes in the embodiment, changes of the duty ratio are not restricted to the linear change in the present invention, and it is possible to express the changes of the duty ratio with a curve, for example, to set a group of time dependent differential coefficients to the duty ratio changing rate.

Figure 10:
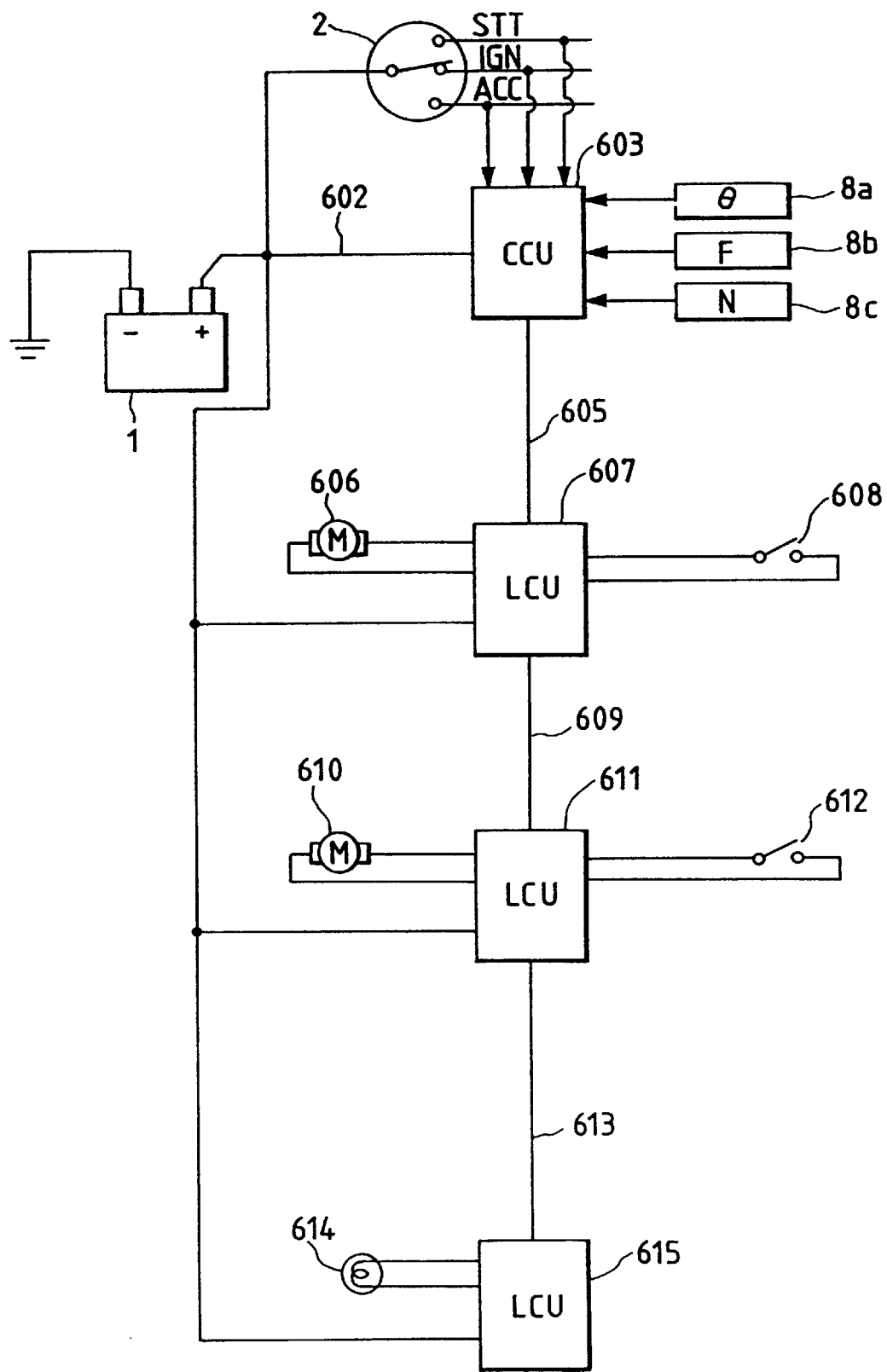
FIG. 10 is a schematic diagram of an apparatus for driving electrical loads of a car in accordance with the invention.

Further, although one control unit 10 executes controls for feeding the power to all the electrical loads, it is also available to control the electrical loads by using a multiplex transmission system in a car (a car LAN system) in which a plurality of control units are connected with a multiplex transmission bus, as shown in FIG. 10.

An apparatus for driving electrical loads of a car shown in FIG. 10, comprises a CCU (Central Control Unit) 603 as a parent unit, LCUs (Local Control Units) 607, 611 and 615 as child units provided at the vicinities of plural electrical loads distributed and arranged in the car, multiplex transmission lines 605, 609 and 613 for electrically connecting among the control units, and a power line 2 for connecting between a battery 1 and the CCU 603, LCUs 607, 611 and 615.

The CCU 603 includes a microcomputer, signal processing circuits for adjusting the levels of outputs from sensors 8a, 8b and 8c to the levels adequate to processing of the microcomputer, an input stage transistor for inputting an output from a key switch 2 to the microcomputer, and a transmission IC (Integrated Circuit) for controlling transmissions among the LCUs 607, 611 and 615. The electrical loads 606, 610 and 614 are connected to each of the LCUs 607, 611 and 625, respectively. Further, load switches 608 and 612 are connected to the LCUs 607 and 611, respectively. Each of the LCUs 607, 611 and 615 includes output stage transistors driven by a driving signal, for feeding power to the electrical load from the battery 1, a transmission LSI for sending the driving signal to the output stage transistors and for controlling the transmission between the LCU and the CCU 603. Further, each of the LCUs 607 and 611 has an input stage transistor for inputting a switch-on/off signal from the load switch 608 or 612.

When the CCU 603 sends data to one of the LCUs, the LCU which has received the data, returns the data to the CCU 603. Therefore, both the data sending signal and the data receiving signal are transmitted on the multiplex transmission line between the LCU and the CCU 603. The data transmission between each of the LCUs and the CCU 603 is performed with a set of the data sending signal and the data receiving signal. To the CCU 603, a position signal of the key switch 2, signals output from the sensors, or switching state signals of the load switches output from the LCUs 607, 611 and 613, are input. The CCU 603 determines the duty ratio of the electrical load, of which the load switch is turned on, based on these input signals, and drives the output stage transistors by sending the driving signal to the output stage transistors connected to the LCU via the transmission LSI of the LCU, so as to feed the power corresponding to the determined duty ratio, to the electrical load. To the electrical load connected to the transistors, the power is fed from the battery 1, corresponding to the ON/OFF state of the driven transistors.

As explained above, distributing and arranging a plurality of control units in a car can reduce the used amounts of a power line and signal lines, in comparison with the centralized data processing method of connecting between a control unit, and plural electrical loads and plural load switches.

By using the present invention, at starting of the electrical loads, because the power fed to the electrical loads from the power source is controlled so as gradually to increase, it does not happen that the AC generator applies a rapid load increase on the engine, due to rapid increase of the power generated by the AC generator, which stabilizes the engine speed.

What is claimed is:

1. A car LAN system for driving electrical loads of a car, comprising:

a plurality of control units distributed and arranged in a car;

electrical loads electrically connected to said plurality of control units;

an operational switch for operating each of said electrical loads; and a transmission bus for connecting said control units;

wherein at least one of said control units is configured to obtain information on operational states by receiving signals from detectors operatively installed in said car and from said operational switches, and at least one of said operational switches being configured so that as it is operated from an OFF state to an ON state, data are transmitted among said control units via said transmission bus so as to feed power to an electrical load corresponding to said switch, and one of said control units is configured to send a control signal to control an amount of power to be fed per unit time, determined on the basis of operational states of said car, to a control unit to which said electrical load is connected, and one of said control units has the relation between power to be fed to each electrical load per unit time and operational states of said car stored therein.

* * * * *